(12) United States Patent
Keller et al.

(10) Patent No.: US 10,558,036 B2
(45) Date of Patent: Feb. 11, 2020

(54) USING OSCILLATION OF OPTICAL COMPONENTS TO REDUCE FIXED PATTERN NOISE IN A VIRTUAL REALITY HEADSET

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 103 days.

(21) Appl. No.: 15/376,844

(22) Filed: Dec. 13, 2016

(65) Prior Publication Data

US 2017/0192228 A1   Jul. 6, 2017

Related U.S. Application Data

(60) Provisional application No. 62/267,748, filed on Dec. 15, 2015.

(51) Int. Cl.
*G02B 27/00*   (2006.01)
*G06F 1/16*   (2006.01)

(52) U.S. Cl.
CPC ......... *G02B 27/0068* (2013.01); *G06F 1/163* (2013.01); *G06F 1/1637* (2013.01)

(58) Field of Classification Search
CPC ....... G02B 27/0068; G09G 5/00; G06F 3/011; G06F 1/163; G06F 1/1637
See application file for complete search history.

(56) References Cited

U.S. PATENT DOCUMENTS

| | | | | |
|---|---|---|---|---|
| 5,777,588 | A * | 7/1998 | Woodgate | G02B 27/2214 345/6 |
| 6,078,038 | A * | 6/2000 | Cooper | G02B 27/646 250/208.1 |
| 6,243,055 | B1 * | 6/2001 | Fergason | G02B 5/3083 345/32 |
| 6,425,669 | B1 * | 7/2002 | Mei | G03F 7/70291 347/239 |
| 6,963,454 | B1 * | 11/2005 | Martins | G02B 13/16 345/8 |

(Continued)

*Primary Examiner* — Grant Sitta
(74) *Attorney, Agent, or Firm* — Fenwick & West LLP

(57) ABSTRACT

A virtual reality (VR) headset includes an electronic display element that outputs image light via a plurality of sub-pixels that are separated from each other by a dark space. To mask the dark space between adjacent sub-pixels in the electronic display element, an optics block (e.g., a lens) in the VR headset oscillates or the electronic display element oscillates. For example, a piezoelectric material is coupled to the electronic display element or to the optics block. When a voltage is applied to the piezoelectric material, vibration of the piezoelectric material causes oscillation of the electronic display element or the optics block. The oscillation generates blur spots in the image light that mask the dark space between adjacent sub-pixels, with each blur spot corresponding to a blurred image of a sub-pixel in the image light.

19 Claims, 4 Drawing Sheets

(56) References Cited

U.S. PATENT DOCUMENTS

| | | | | |
|---|---|---|---|---|
| 7,097,311 B2* | 8/2006 | Jaynes | H04N 9/3147 348/744 |
| 2003/0218618 A1* | 11/2003 | Phan | G09G 3/2074 345/629 |
| 2004/0150651 A1* | 8/2004 | Phan | G09G 3/2003 345/589 |
| 2006/0176323 A1* | 8/2006 | Bommersbach | H04N 9/3114 345/697 |
| 2006/0176362 A1* | 8/2006 | Penn | B41J 2/465 347/239 |
| 2006/0250696 A1* | 11/2006 | McGuire | G02B 27/0172 359/630 |
| 2008/0180648 A1* | 7/2008 | Mei | G03B 27/54 355/67 |
| 2010/0026173 A1* | 2/2010 | Lhee | H01L 27/3211 313/504 |
| 2011/0141297 A1* | 6/2011 | Orimoto | G03B 5/00 348/208.4 |
| 2011/0211097 A1* | 9/2011 | Omori | G03B 5/02 348/264 |
| 2012/0105582 A1* | 5/2012 | Youn | G06T 3/4069 348/43 |
| 2013/0207951 A1* | 8/2013 | Didyk | G06T 3/40 345/207 |
| 2014/0178861 A1* | 6/2014 | Duer | G02B 6/4226 435/5 |
| 2015/0077618 A1* | 3/2015 | Ueno | G02B 13/0035 348/340 |
| 2015/0205014 A1* | 7/2015 | Akasaka | G02B 3/0056 359/619 |
| 2015/0277121 A1* | 10/2015 | Fridental | H04N 13/363 348/54 |
| 2015/0338660 A1* | 11/2015 | Mukawa | G02B 5/30 359/13 |
| 2016/0116979 A1* | 4/2016 | Border | G06F 3/013 345/156 |
| 2017/0221266 A1* | 8/2017 | Schubert | G06T 3/4076 |

* cited by examiner

US 10,558,036 B2

USING OSCILLATION OF OPTICAL COMPONENTS TO REDUCE FIXED PATTERN NOISE IN A VIRTUAL REALITY HEADSET

CROSS-REFERENCE TO RELATED APPLICATIONS

This application claims priority to U.S. Provisional Patent Application No. 62/267,748, filed Dec. 15, 2015, which is incorporated by reference in its entirety.

BACKGROUND

The present disclosure generally relates to reducing fixed pattern noise, and specifically relates to reducing fixed pattern noise using piezoelectric materials to oscillate components of a display.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. Some arrangements of sub-pixels may increase fixed pattern noise under certain conditions. For example, magnification of a pixel may result in boundaries between individual sub-pixels of the pixel becoming visible to the user, resulting in a "screen door" pattern (i.e., an increase in fixed pattern noise) in an image presented to a user.

SUMMARY

An image presented by an electronic display element within a virtual reality (VR) headset of a VR system is magnified beyond a threshold amount (e.g., magnified several-fold). As a result, an optics block included in the VR headset may cause a user viewing the image through the VR headset to see individual sub-pixels of a pixel in the image, as well as dark space between the sub-pixels (i.e., fixed pattern noise or the "screen door effect"). To reduce this screen door effect, the electronic display element of the VR headset or an optics block of the VR headset is oscillated to blur light from the sub-pixels to mask the fixed pattern noise.

The VR headset includes an electronic display including an electronic display element that outputs image light via a plurality of sub-pixels. In various embodiments, various sub-pixels have different colors and are separated from each other by a dark space. In some embodiments, the electronic display includes different electronic display elements for each eye of the user. Alternatively, a single electronic display element is used to display images to both eyes of the user.

In one embodiment, an optics block included in the VR headset is oscillated to reduce fixed pattern noise. For example, a piezoelectric material is coupled to the optics block that vibrates the optics block. Alternatively, the optics block includes a lens made from a piezoelectric material that causes the lens to vibrate. In other embodiments, a piezoelectric material is coupled to the electronic display element in the VR headset, causing the electronic display element to vibrate and reduce fixed pattern noise in image data presented to a user via the VR headset.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
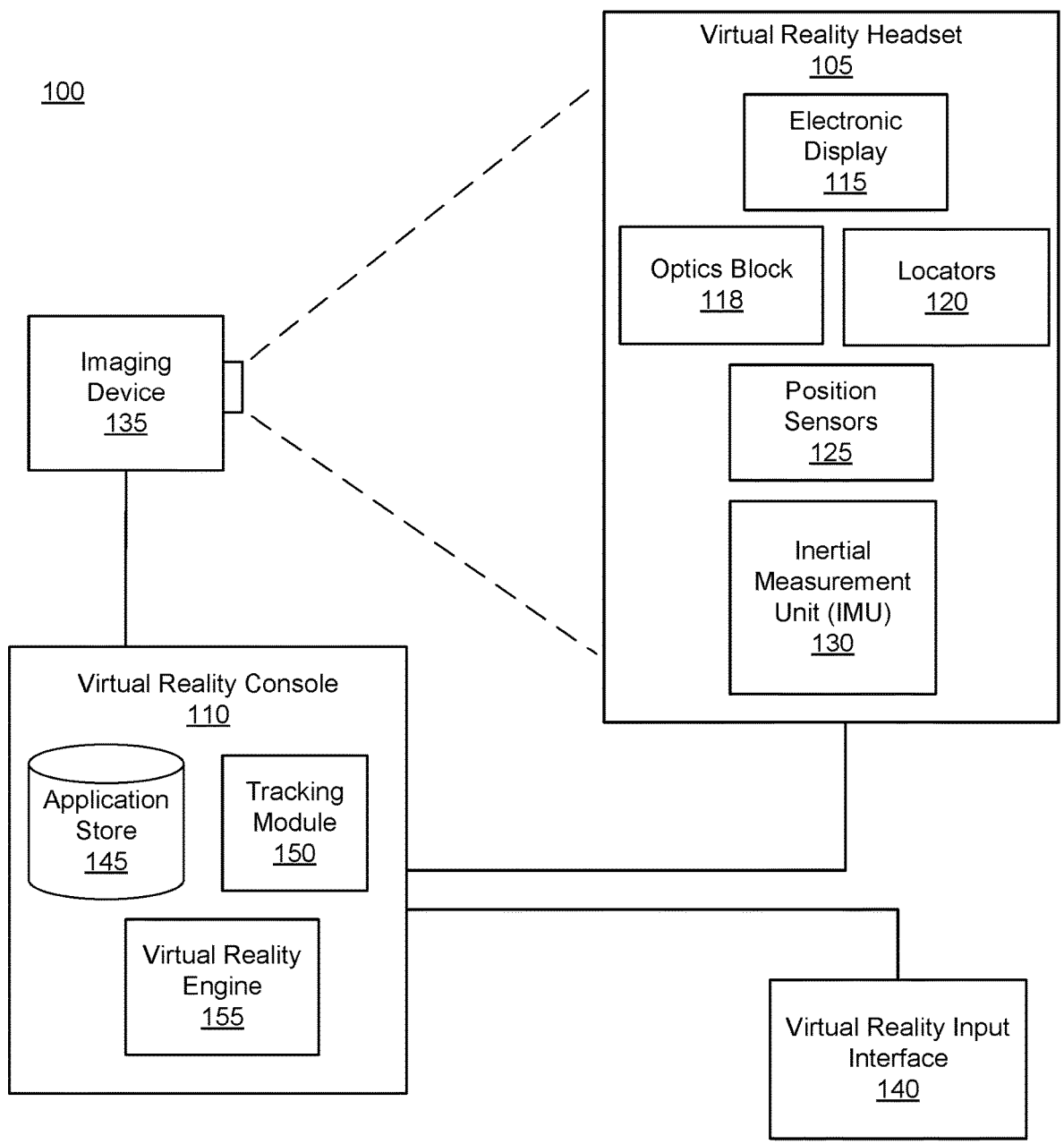
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective element 116, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. In embodiments where the sub-pixels are arrayed hexagonally, the corrective element 116 may be configured to generate amounts of blur that causes the array of sub-pixels in the image presented to the user to appear to be arrayed in a rectangular layout.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. However, magnification of image light may cause an increase in fixed pattern noise, also referred to as the "screen door effect," which is a visual artifact where dark space separating pixels and/or sub-pixels of a display become visible to a user in an image presented by the display. In various embodiments, the optics block 118 vibrates to blur received image light to cover the dark space between the adjacent sub-pixels. For example, a piezoelectric material is coupled to the optics block 118 and vibrates the optics block 118 to blur image light received by the optics block 118. Alternatively, the optics block 118 includes one or more components, such as lenses, made from piezoelectric material that vibrates to blur received image light, as further described below in conjunction with FIG. 2B. Additionally, the optics block 118 may be designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error in addition to fixed pattern noise (i.e., the screen door effect). Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/ back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. As further described below in conjunction with FIG. 3, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
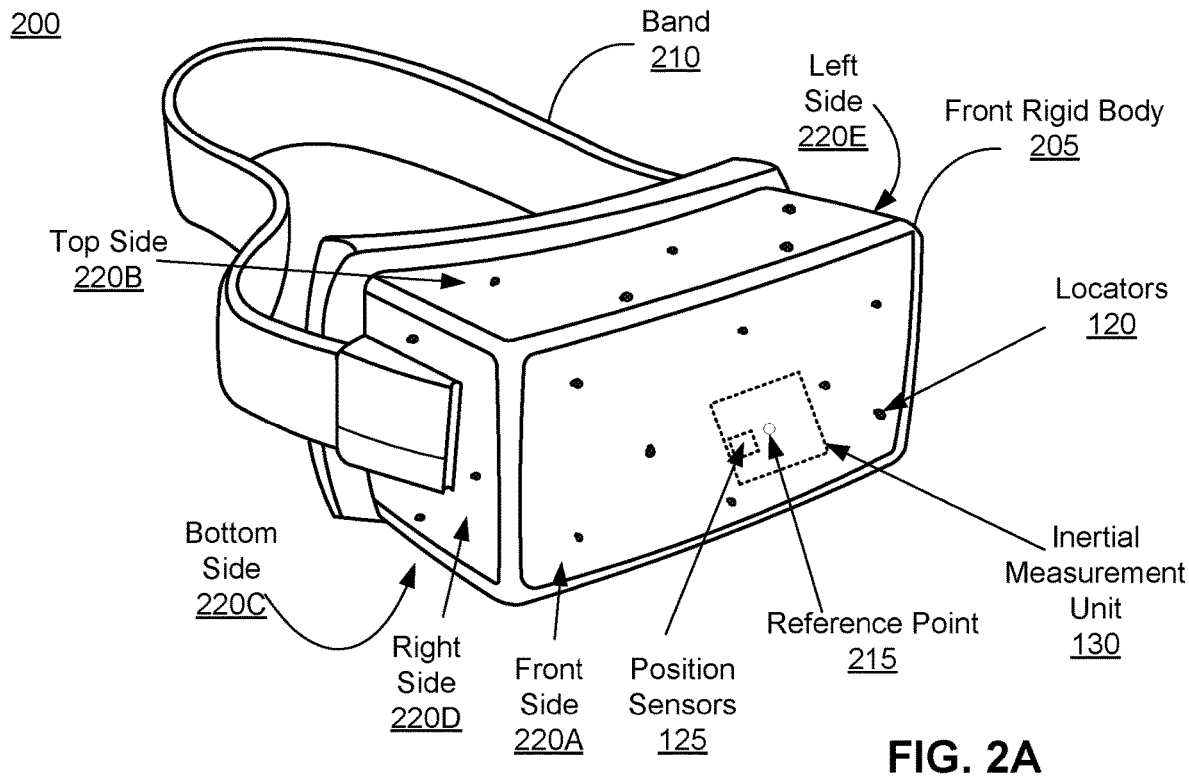
FIG. 2A is a wire diagram of a virtual reality headset, in accordance with an embodiment.

FIG. 2A is a wire diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
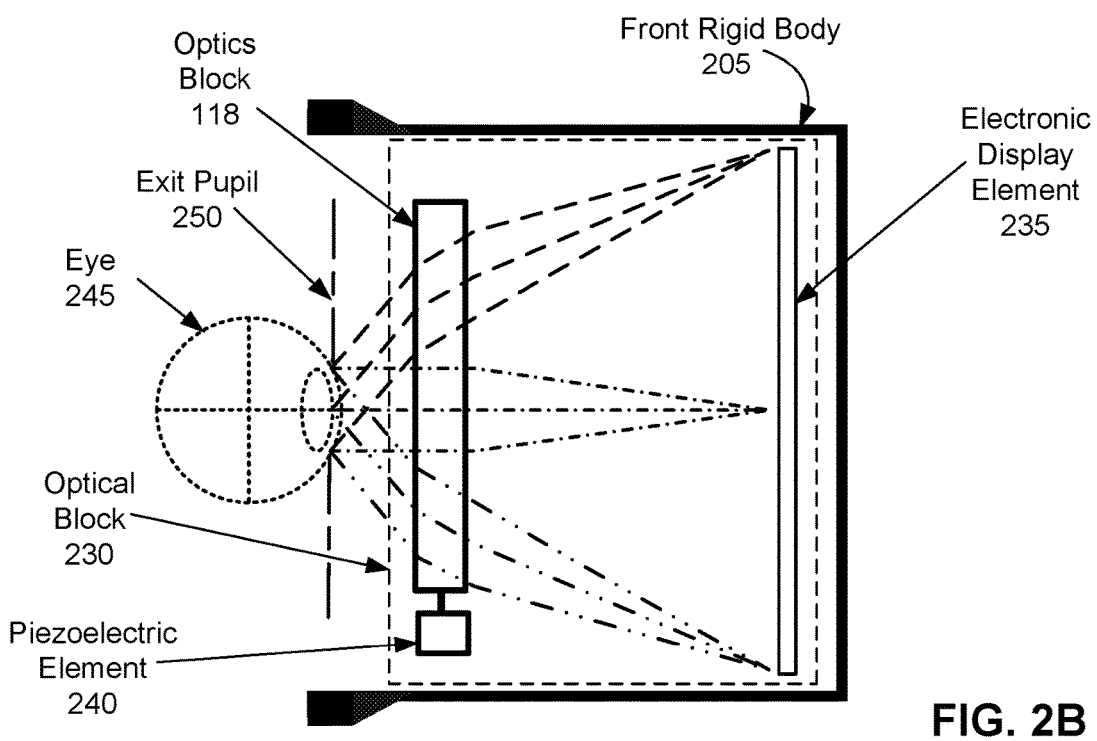
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115, the optics block 118, and a piezoelectric element 240 coupled to the optics block 118. The piezoelectric element 240 is a piezoelectric material, such as polyvinylidene difluoride (PEVDF) or another suitable piezoelectric material. A voltage is applied to the piezoelectric element 240, causing the piezoelectric material comprising the piezoelectric element 240 to vibrate. In some embodiments, the piezoelectric element 240 vibrates at a frequency matching a frequency of the fixed pattern noise but out of phase with the fixed pattern noise to attenuate or cancel the fixed pattern noise. In other embodiments, the piezoelectric element 240 vibrates at a frequency that modulates the fixed pattern noise. For example, the piezoelectric element 240 vibrates at a frequency that spreads a spectrum of the fixed pattern noise or moves the fixed pattern noise to one or more frequencies to which a user is less visually sensitive. As the piezoelectric element 240 in the embodiment of FIG. 2B is coupled to the optics block 118, vibration of the piezoelectric element causes the optics block 118 to oscillate and blur image light emitted by the electronic display element 235 and directed towards the optics block 118. Blurring of the image light by the oscillating optics block 118 corrects for fixed pattern noise, and the blurred image light is directed towards the exit pupil 250 for presentation to the user. In some embodiments, the optics block 118 may also correct for one or more additional optical errors (e.g., distortion, astigmatism, etc.). The optics block 118 directs the corrected image light to the exit pupil 250 for presentation to the user.

In some embodiments, the piezoelectric element 240 is coupled to the optics block 118 so the optics block 118 oscillates perpendicularly to the exit pupil 250. For example, in FIG. 2B, vibration of the piezoelectric element 240 causes the optical block 230 to oscillate horizontally. Alternatively, the piezoelectric element 230 is coupled to the optics block 118 so the optics block 118 oscillates parallel to the exit pupil 250. As an example, the optics block 118 in FIG. 2B oscillates vertically in certain embodiments.

While FIG. 2B shows an embodiment where the piezoelectric element 240 is coupled to the optics block 118, in other embodiments, one or more components in the optics block 118 comprise piezoelectric materials. For example, a lens included in the optics block 118 comprises a piezoelectric material. Applying a voltage to the lens causes the lens to vibrate and blur image light from the electronic display element 235 to compensate for fixed pattern noise. Various piezoelectric materials, such as those described above, may comprise the lens in various embodiments.

Figure 2C:
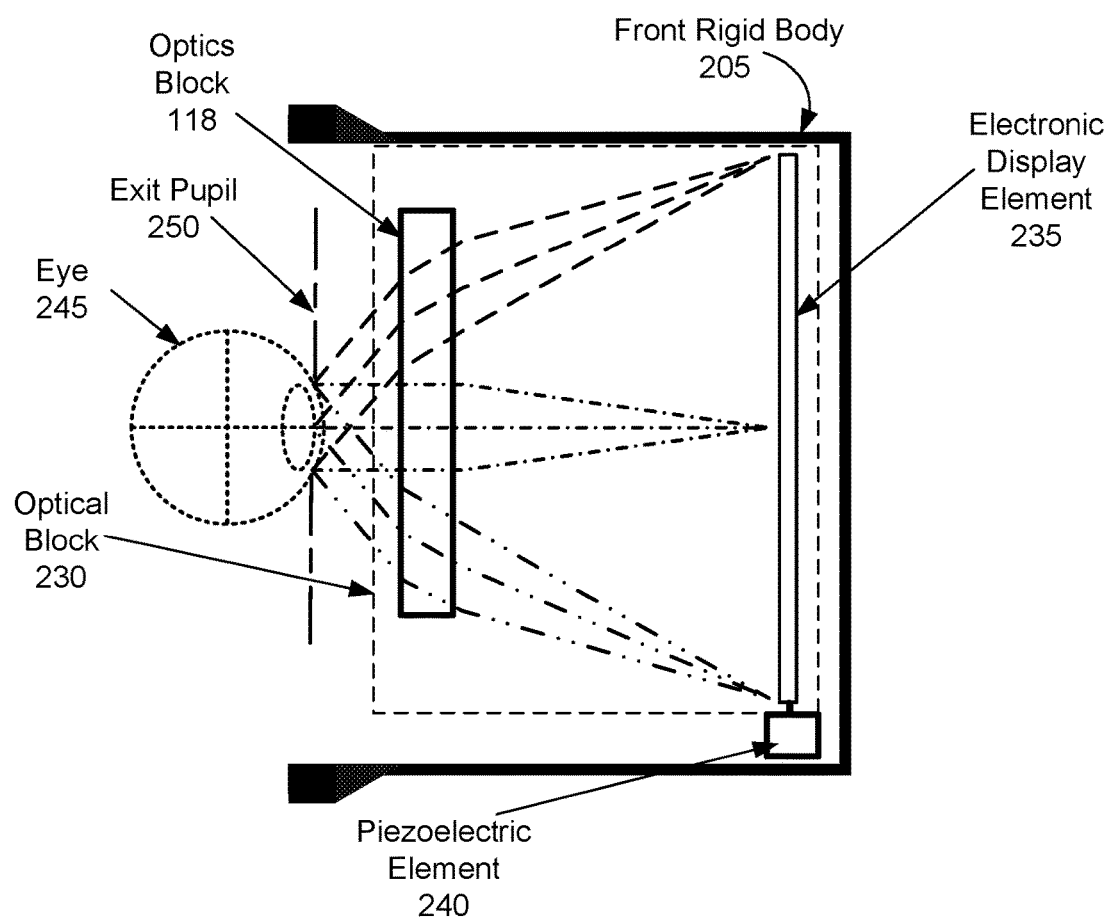
FIG. 2C is a cross section of a front rigid body of the VR headset in FIG. 2A with a piezoelectric element coupled to the electronic display element, in accordance with an embodiment.

FIG. 2C shows an alternative embodiment where the piezoelectric element 240 is coupled to the electronic display element 235. In the embodiment shown by FIG. 2C, the piezoelectric element 240 vibrates when a voltage is applied to it, which causes the electronic display element 235 to oscillate. The oscillation of the electronic display element blurs image light transmitted towards the optics block 118 by the electronic display element 235, which compensates for fixed pattern noise. The optics block 118 magnifies the blurred image light to generate an image that is corrected for fixed pattern noise and that is directed to the exit pupil 250. In various embodiments, vibration of the piezoelectric element 240 causes the electronic display element 235 to oscillate perpendicularly to the exit pupil 250 (e.g., horizontally) or to oscillate parallel to the exit pupil 250 (e.g., vertically).

A piezoelectric element 240 coupled to the electronic display element 235 oscillates the electronic display element as a piezoelectric element 240 coupled to the optics block 118 causes the optics block 118 to oscillate. Hence, in some embodiments, the piezoelectric element 240 comprises different materials when coupled to the electronic display element 235 and when coupled to the optics block 118; alternatively, the piezoelectric element 240 comprises a common material when coupled to the electronic display element 235 and when coupled to the optics block 118. Additionally, any suitable device having high activation bandwidth and controllable force effects may be used in the piezoelectric element 240. Example devices include a linear motor, voice coil actuator, thermo electric driver, and a media phase change driver.

While FIGS. 2B and 2C show embodiments where a piezoelectric element 240 is coupled to the optics block 118 and to the electronic display element, respectively, in other embodiments, any suitable vibrating element may be coupled to the optics block or to the electronic display element 235. For example, a micro electrical mechanical system (MEMS) oscillator or resonator is coupled to the optics block 118 or to the electronic display element 235. However, in various embodiments, any suitable component capable of inducing oscillation may be coupled to the optics block 118 or to the electronic display element 235.

Figure 3A:
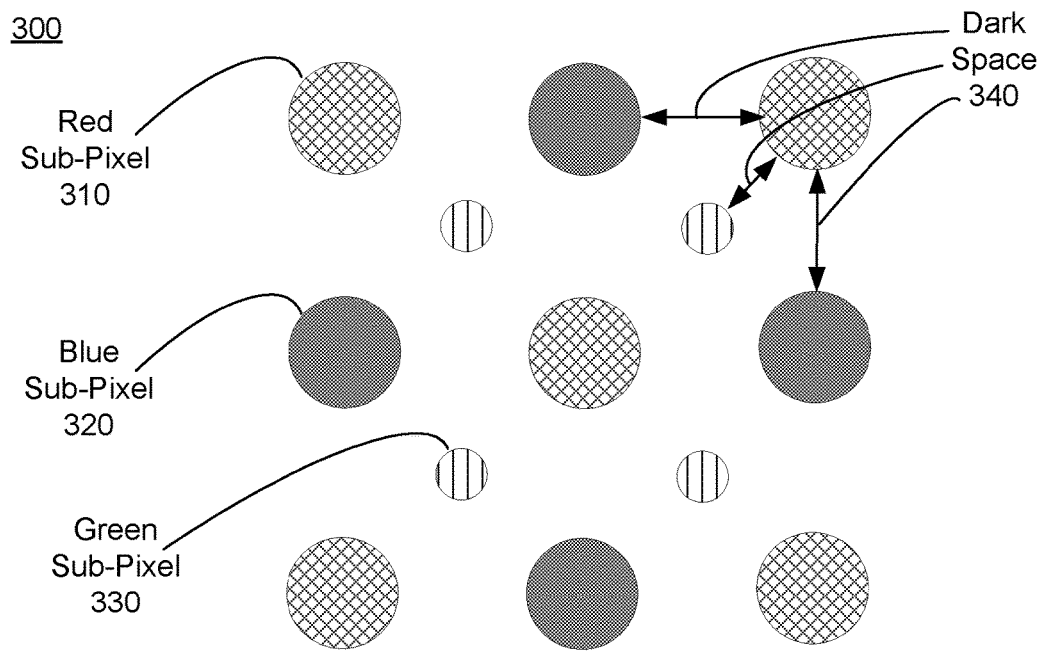
FIG. 3A is an example array of sub-pixels on an electronic display element, in accordance with an embodiment.

FIG. 3A is an example array 300 of sub-pixels on the electronic display element 235. The example array 300 shown in FIG. 3A includes red sub-pixels 310, blue sub-pixels 320, and green sub-pixels 330. For example, the array 300 is portion of a PENTILE® display. A dark space 340 separates each sub-pixel from one or more adjacent sub-pixels. The dark space 340 is a portion of the array 300 that does not emit light, and may become visible to a user under certain circumstances (e.g., magnification) causing the screen door effect that degrades image quality. As discussed above in conjunction with FIGS. 2B and 2C, the optics block 118 or the electronic display element 235 may be oscillated to blur image light transmitted by the electronic display element to reduce fixed pattern noise so the dark space 340 between the sub-pixels is not visible to the user. The electronic display element 235 or the optics block 118 may oscillate so image light generated by different sub pixels is blurred to generate blur spots that are large enough to mask the dark space 340 between adjacent sub-pixels, while still allowing the image light from adjacent sub-pixels to be resolved by a user as image light from separate sub-pixels.

Figure 3B:
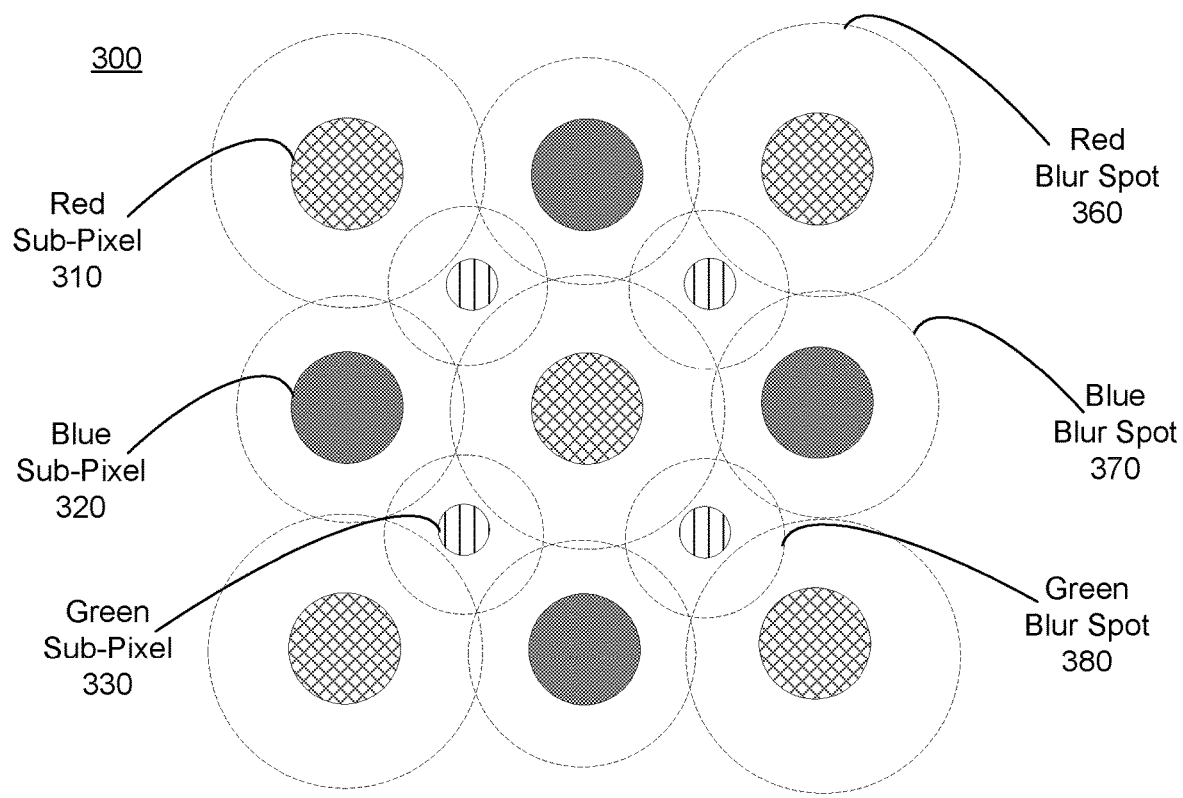
FIG. 3B is an example of image light emitted by an array of sub-pixels and adjusted by oscillation of an optics block or of an electronic display element, in accordance with an embodiment.

FIG. 3B is an example of image light emitted by an array of sub-pixels (e.g., array 300) and adjusted by oscillation of the optics block 118 or of the electronic display element 235. As shown in FIG. 3B, each of the sub-pixels has an associated blur spot. Specifically, the red sub-pixels 310 have a corresponding red blur spot 360, the blue sub-pixels 320 have a corresponding blue blur spot 370, and the green sub-pixels 330 have a corresponding green blur spot 380. A blur spot is an area filled with an image of a blurred sub-pixel. So long as a blur spot does not overlap with a point of maximum intensity of an adjacent blur spot, the two blur spots are resolvable as two adjacent sub-pixels by a user. While FIG. 3B shows blur spots a circular, a blur spot is an area including the blurred image of a sub-pixel and may have any suitable shape. The electronic display element 235 or the optics block 118 is configured to vibrate so that after magnification by the optics block 118, blur spots associated with sub-pixels mask the dark space 340 between adjacent sub-pixels.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:
1. A virtual reality (VR) headset comprising:
an electronic display element configured to output image light via a plurality of sub-pixels having different colors, sub-pixels separated from each other by a dark space;
a corrective optics block configured to:
  magnify the image light received from the electronic display element, and
  direct the magnified image light to an exit pupil of the VR headset corresponding to a location of an eye of a user of the VR headset; and
a piezoelectric element coupled to the corrective optics block, the piezoelectric element configured to vibrate when a voltage is applied to the piezoelectric element so the corrective optics block vibrates, the piezoelectric element configured to vibrate the corrective optics block so that image light generated by a sub-pixel of the electronic display element masks the dark space between the sub-pixel and sub-pixels adjacent to the sub-pixel, the image light generated by the sub-pixel comprising a blur spot, the blur spot not overlapping with a point of maximum intensity of a blur spot generated by an adjacent sub-pixel of the sub-pixel.

2. The system of claim 1, wherein a frequency of the vibration comprises a frequency matching a frequency of noise in the image light caused by the dark space between adjacent sub-pixels of the electronic display element that is out of phase with the noise in the image light caused by the dark space between adjacent sub-pixels of the electronic display element.

3. The system of claim 2, wherein the noise in the image light is caused by the dark space between adjacent sub-pixels of the electronic display element.

4. The system of claim 3, wherein the frequency of the vibration comprises a frequency that spreads a spectrum of noise in the image light caused by the dark space between adjacent sub-pixels of the electronic display element.

5. The system of claim 3, wherein the frequency of the vibration comprises a frequency that movies noise in the image light caused by the dark space between adjacent sub-pixels of the electronic display element to one or more different frequencies.

6. The system of claim 5, wherein the one or more different frequencies comprise frequencies to which the user is less visually sensitive.

7. The system of claim 1, wherein the piezoelectric element is coupled to the corrective optics block so vibration of the piezoelectric element causes the corrective optics block to vibrate perpendicularly to the exit pupil.

8. The system of claim 1, wherein the piezoelectric element is coupled to the corrective optics block so vibration of the piezoelectric element causes the corrective optics block to vibrate parallel to the exit pupil.

9. The system of claim 1, wherein the piezoelectric element includes one or more selected from a group consisting of: a linear motor, a voice coil actuator, a thermo electric driver, a media phase change driver, and any combination thereof.

10. A virtual reality (VR) headset comprising:
an electronic display element configured to output image light via a plurality of sub-pixels having different colors, sub-pixels separated from each other by a dark space;
a piezoelectric element coupled to a corrective optics block, the piezoelectric element configured to vibrate when a voltage is applied to the piezoelectric element so the electronic display vibrates at a frequency, the piezoelectric element configured to vibrate the corrective optics block so that image light generated by a sub-pixel of the electronic display element masks the dark space between the sub-pixel and sub-pixels adjacent to the sub-pixel, the image light generated by the sub-pixel comprising a blur spot, the blur spot not overlapping with a point of maximum intensity of a blur spot generated by an adjacent sub-pixel of the sub-pixel; and the corrective optics block configured to:
magnify the blurred image light received from the electronic display element, and
direct the magnified blurred image light to an exit pupil of the VR headset corresponding to a location of an eye of a user of the VR headset.

11. The system of claim 10, wherein a frequency of the vibration matches a frequency of noise in the image light caused by the dark space between adjacent sub-pixels of the electronic display element that is out of phase with the noise in the image light caused by the dark space between adjacent sub-pixels of the electronic display element.

12. The system of claim 11, wherein the noise in the image light is caused by the dark space between adjacent sub-pixels of the electronic display element.

13. The system of claim 12, wherein the frequency of the vibration comprises a frequency that spreads a spectrum of noise in the image light caused by the dark space between adjacent sub-pixels of the electronic display element.

14. The system of claim 12, wherein the frequency of the vibration comprises a frequency that movies noise in the image light caused by the dark space between adjacent sub-pixels of the electronic display element to one or more different frequencies.

15. The system of claim 14, wherein the one or more different frequencies comprise frequencies to which the user is less visually sensitive.

16. The system of claim 10, wherein the piezoelectric element is coupled to the electronic display element so vibration of the piezoelectric element causes the electronic display element to vibrate perpendicularly to the exit pupil.

17. The system of claim 10, wherein the piezoelectric element is coupled to the electronic display element so vibration of the piezoelectric element causes the electronic display element to vibrate parallel to the exit pupil.

18. The system of claim 10, wherein the piezoelectric element includes one or more selected from a group consisting of: a linear motor, a voice coil actuator, a thermo electric driver, a media phase change driver, and any combination thereof.

19. A virtual reality (VR) headset comprising:
an electronic display element configured to output image light via a plurality of sub-pixels having different colors, sub-pixels separated from each other by a dark space;
a corrective optics block including a lens comprising a piezoelectric material that is configured to vibrate at a frequency, the piezoelectric element configured to vibrate the corrective optics block so image light generated by a sub-pixel of the electronic display element masks the dark space between the sub-pixel and sub-pixels adjacent to the sub-pixel, the image light generated by the sub-pixel comprising a blur spot, the blur spot not overlapping with a point of maximum intensity of a blur spot generated by an adjacent sub-pixel of the sub-pixel, the corrective optics block configured to:
magnify the blurred image light received from the electronic display element, and
direct the magnified blurred image light to an exit pupil of the VR headset corresponding to a location of an eye of a user of the VR headset.

* * * * *